(12) United States Patent
Detwiler

(10) Patent No.: US 9,755,746 B1
(45) Date of Patent: Sep. 5, 2017

(54) SYSTEMS AND METHODS FOR DIGITALLY SPLITTING AN OPTICAL LINE TERMINAL ACROSS MULTIPLE FIBERS

(71) Applicant: Thomas Frederick Detwiler, Huntsville, AL (US)

(72) Inventor: Thomas Frederick Detwiler, Huntsville, AL (US)

(73) Assignee: ADTRAN, Inc., Huntsville, AL (US)

( * ) Notice: Subject to any disclaimer, the term of this patent is extended or adjusted under 35 U.S.C. 154(b) by 329 days.

(21) Appl. No.: 14/505,677

(22) Filed: Oct. 3, 2014

(51) Int. Cl.
| | |
|---|---|
| H04J 14/00 | (2006.01) |
| H04B 10/00 | (2013.01) |
| H04L 12/28 | (2006.01) |
| H04B 10/2575 | (2013.01) |
| H04B 10/27 | (2013.01) |
| H04B 10/40 | (2013.01) |

(52) U.S. Cl.
CPC ......... *H04B 10/2575* (2013.01); *H04B 10/27* (2013.01); *H04B 10/40* (2013.01)

(58) Field of Classification Search
CPC .................................................. H04J 14/023
See application file for complete search history.

(56) References Cited

U.S. PATENT DOCUMENTS

| | | | | |
|---|---|---|---|---|
| 7,181,142 B1 * | 2/2007 | Xu | ............................ | H04J 3/14 |
| | | | | 398/58 |
| 8,879,914 B2 * | 11/2014 | Suvakovic | ........... | H04B 10/272 |
| | | | | 370/352 |
| 2006/0171714 A1 | 8/2006 | Dove | | |
| 2008/0037535 A1 * | 2/2008 | Yoon | ...................... | H04H 20/69 |
| | | | | 370/389 |
| 2010/0098407 A1 * | 4/2010 | Goswami | ............. | H04B 10/032 |
| | | | | 398/5 |

(Continued)

OTHER PUBLICATIONS

ITU-T G.984.6, "Series G: Transmission Systems and Media, Digital Systems and Networks," International Telecommunication Union, Mar. 2008, pp. 1-33.

(Continued)

*Primary Examiner* — Ken N Vanderpuye
*Assistant Examiner* — Amritbir Sandhu
(74) *Attorney, Agent, or Firm* — Maynard Cooper & Gale, P.C.; Jon E. Holland

(57) ABSTRACT

The physical layer of an optical line terminal (OLT) of an optical network is split across multiple fibers so that the OLT has a plurality of optical transceivers for respectively communicating across a plurality of optical fibers. Thus, each optical transceiver is in communication with a smaller number of optical network units (ONUs) relative to an embodiment for which a single optical transceiver is employed, thereby reducing the transmit power requirements of the optical network. Accordingly, less expensive optical components, such as lasers, can be used at the OLT and the ONUs. In addition, the split at the OLT is implemented digitally, and the digital components of the OLT are arranged such that various performance benefits are realized. As an example, the OLT may be configured such that data and/or overhead may be simultaneously transmitted in the upstream direction thereby increasing the upstream throughput and capacity of the optical network.

27 Claims, 9 Drawing Sheets

(56) References Cited

U.S. PATENT DOCUMENTS

| | | | |
|---|---|---|---|
| 2011/0044699 A1* | 2/2011 | Li | H04J 3/1694 398/182 |
| 2011/0268457 A1* | 11/2011 | Xu | H03F 1/083 398/155 |
| 2011/0286340 A1* | 11/2011 | Janecek | H04L 1/0036 370/252 |
| 2012/0063770 A1* | 3/2012 | Tsuji | H04B 10/27 398/25 |
| 2012/0087652 A1* | 4/2012 | Horishita | H04L 12/2861 398/25 |
| 2012/0128372 A1* | 5/2012 | Nakura | H04B 10/50 398/155 |
| 2013/0045010 A1* | 2/2013 | Mukai | H04B 10/07 398/52 |
| 2013/0089091 A1* | 4/2013 | Diab | H04L 12/12 370/389 |
| 2013/0129354 A1* | 5/2013 | Tanaka | H04L 43/0811 398/66 |
| 2013/0148968 A1* | 6/2013 | Takizawa | H04L 7/04 398/66 |
| 2014/0010534 A1* | 1/2014 | Sun | H04B 10/27 398/45 |
| 2014/0199069 A1* | 7/2014 | Garavaglia | H04Q 11/0067 398/66 |
| 2014/0294388 A1* | 10/2014 | Odaka | H04B 10/27 398/66 |
| 2016/0020868 A1* | 1/2016 | Lee | H04J 14/023 398/58 |
| 2016/0261337 A1* | 9/2016 | Mukai | H04B 10/03 |
| 2017/0012731 A1* | 1/2017 | Luo | H04J 14/023 |

OTHER PUBLICATIONS

ITU-T G.984.6 Amendment 1, "Series G: Transmission Systems and Media, Digital Systems and Networks," International Telecommunication Union, Mar. 2008, pp. 1-20.

ITU Study Group 15 Contribution, "Electrically Splitting OEO (ES-OEO) Reach Extension text for G.987.4," International Telecommunication Union, Jun. 2011, pp. 1-4.

* cited by examiner

SYSTEMS AND METHODS FOR DIGITALLY SPLITTING AN OPTICAL LINE TERMINAL ACROSS MULTIPLE FIBERS

RELATED ART

In a passive optical network (PON), an optical line terminal (OLT) typically communicates with a plurality of optical network units (ONUs) via an optical fiber that is shared by the ONUs. Communication across the optical fiber is time-division multiplexed, and the OLT uses a control channel, typically embedded in the optical protocol of the PON, in order to transmit control information for informing each ONU when to transmit across the fiber and when to expect data from the OLT.

Between the OLT and the ONUs, at least one optical splitter is used to split the fiber so that the fiber can be connected to a plurality of ONUs. At the splitter, optical power is divided across multiple fibers. As the number of ONUs is increased, more transmit power is required at the OLT and the ONUs in order to successfully communicate through the splitter and, therefore, the PON. Often, to meet higher power requirements, a more expensive laser is needed at the OLT and each ONU.

To address this problem, an OLT is sometimes split across multiple fibers such that a separate optical transceiver is used at the OLT for each fiber. That is, the same downstream signal is transmitted from the OLT across multiple fibers by multiple optical transceivers. In addition, the upstream data streams received by the optical transceivers at the OLT are multiplexed together before being processed by the OLT. Thus, the configuration and operation of the media access control (MAC) layer of the OLT is the same as in single-fiber embodiments, but the physical layer of the OLT is divided across multiple fibers. Since each OLT transceiver is connected to fewer ONUs, the transmission power requirements of the PON are lower, and less expensive lasers can, therefore, be used at the OLT and the ONUs. Although the splitting of the OLT physical layer across multiple fibers can help to reduce the overall cost of the PON, it generally has little effect on the PONs throughput and capacity. Techniques for increasing the performance of a PON and, specifically, increasing the PON's capacity or throughput are generally desired.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to systems and methods for digitally splitting an optical line terminal (OLT) of an optical network across a plurality of optical fibers. In this regard, the physical layer of the OLT is split across multiple fibers so that the OLT has a plurality of optical transceivers for respectively communicating across a plurality of optical fibers. Thus, each optical transceiver is in communication with a smaller number of optical network units (ONUs) relative to an embodiment for which a single optical transceiver is employed, thereby reducing the transmit power requirements of the optical network. Accordingly, less expensive optical components, such as lasers, can be used at the OLT and the ONUs. In addition, the split at the OLT is implemented digitally, and the digital components of the OLT are arranged such that various performance benefits are realized. As an example, the OLT may be configured such that data and/or overhead may be simultaneously transmitted in the upstream direction thereby increasing the upstream throughput and capacity of the optical network.

Figure 1:
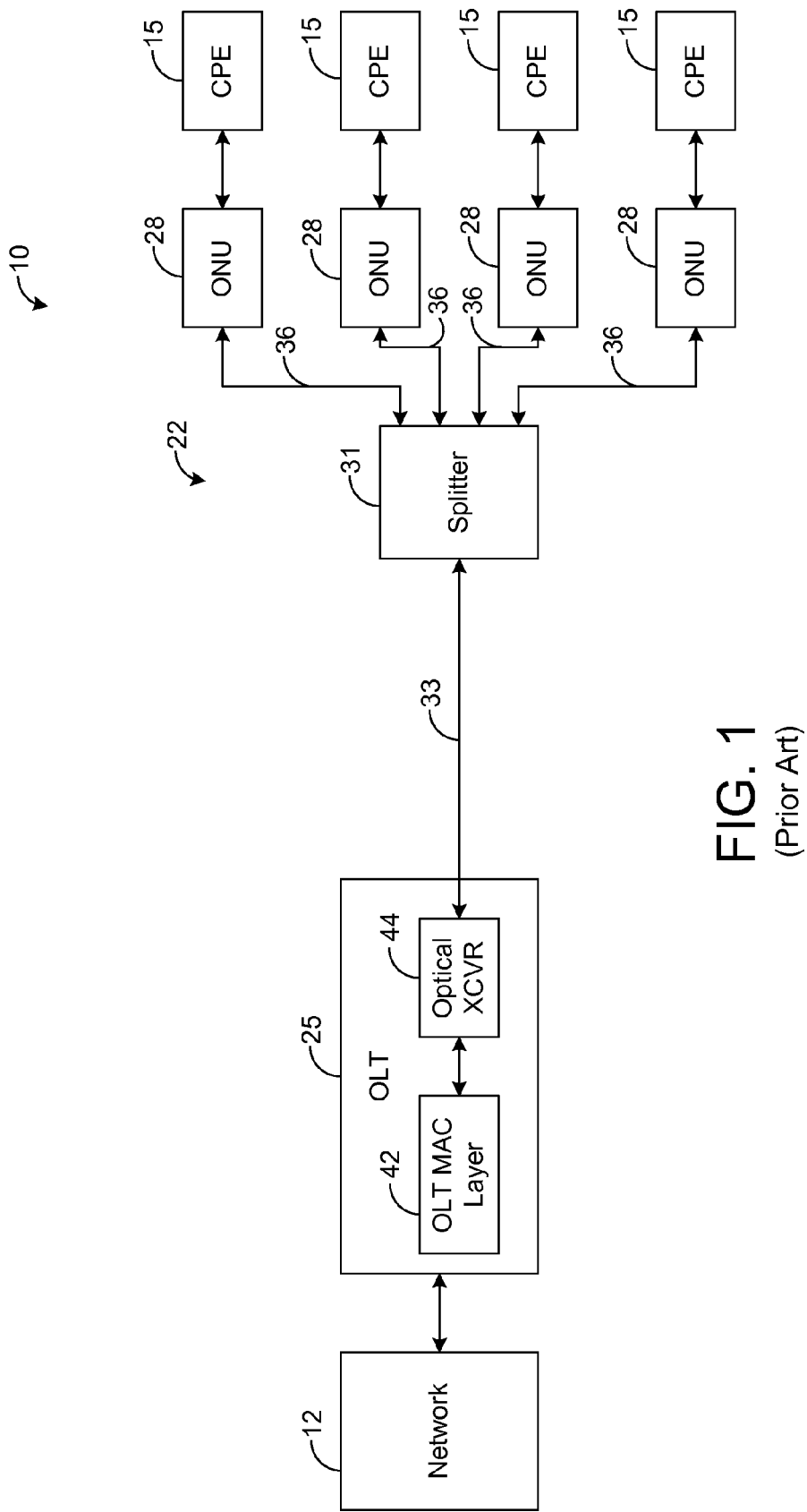
FIG. 1 is a block diagram illustrating a conventional communication system having an optical line terminal (OLT) for communicating with a plurality of optical network units (ONUs).

FIG. 1 depicts a conventional communication system 10 for communicating between a network 12, such as the publicly switched telephone network (PSTN) or other type of network, and customer premises equipment (CPE) at one or more customer premises. In the system 10 shown by FIG. 1, a passive optical network (PON) 22 is used to communicate across at least a portion of the system 10 between the network 12 and the CPE 15. The PON 22 has an optical line terminal (OLT) 25 that is coupled to a plurality optical network units (ONUs) 28. In this regard, the OLT 25 is coupled to an optical splitter 31 via an optical fiber 33 that extends between the splitter 31 and the OLT 25, and the optical fiber 33 is shared among the ONUs 28. Further, each ONU 28 is coupled to the splitter 31 via a respective optical fiber 36 that extends between the splitter 31 and the ONU 28.

For the downstream direction, the OLT 25 is configured to receive from the network 12 data packets to be transmitted to CPE 15. The OLT 25 has a media access control (MAC) layer 42 that is configured to format the data packets for transmission across the PON 22 according to a desired optical protocol, such as Gigabit PON (GPON) or some other known optical protocol. Specifically, the OLT MAC layer 42 adds to one or more data packets overhead that is used for communicating the data packets across the PON 22 downstream, and the OLT MAC layer 42 sends the downstream packet transmissions in a continuous stream of data to an optical transceiver 44 that converts a signal carrying such continuous transmissions from the electrical domain to the optical domain. As an example, the optical transceiver 44 may have a laser that is configured to modulate an optical signal with the continuous transmissions and to transmit the optical signal through the optical fiber 33.

At the splitter 31, the optical signal is split such that it is transmitted through each optical fiber 36 to each of the ONUs 28. Thus, the signal's power is divided across the optical fibers 36. That is, the power of the optical signal on a given optical fiber 36 is less than the power of the signal on the optical fiber 33 feeding the splitter 31.

Each of the ONUs 28 is configured to receive the optical signal transmitted by the OLT 25 and to convert the signal from the optical domain to the electrical domain. The ONU 28 is further configured to transmit data packets from the converted signal to the CPE 15 that is coupled to it. As an example, the ONU 28 may modulate an electrical signal with the data packets using Ethernet protocols, digital subscriber line (DSL) protocols or some other known protocol and then transmit the modulated signal to the CPE 15.

For the upstream direction, each ONU 28 is configured to receive, from the CPE 15 coupled to it, a modulated signal carrying data packets to be transmitted through the network 12. The ONU 28 is configured to demodulate the received signal thereby recovering the data packets and to format the data packets for transmission across the PON 22. Specifically, the ONU 28 adds to one or more of the data packets overhead that is used for communicating the data packets across the PON 22 in upstream burst transmissions, and the ONU 28 converts the upstream burst transmissions from the electrical domain to the optical domain, thereby defining an optical signal for transmission to the OLT 25. As an example, the ONU 28 may comprise a laser that is configured to modulate an optical signal with the upstream burst transmissions and to transmit the optical signal through the optical fiber 28 that is coupled to it.

Note that the communication occurring through the PON 22 is time-division multiplexed. In this regard, the OLT 25 communicates control information to each of the ONUs 28 via a control channel. Such control channel may be embedded in the optical protocol of the PON 22 (e.g., included in overhead communicated through the PON 22), although other techniques may be used to communicate the control information, if desired. The control information informs each ONU 28 when it is permitted to transmit to the OLT 25 and when the ONU 28 is expected to receive downstream packet transmissions from the OLT 25. In this regard, at any given instant, only one ONU 28 is permitted to transmit across the optical fiber 33 preventing data collisions on the fiber 33, which is shared by all of the ONUs 28 of the PON 22. The downstream signals are communicated at a different wavelength relative to the upstream signals so that transmissions may be simultaneously communicated upstream and downstream without interference.

Figure 2:
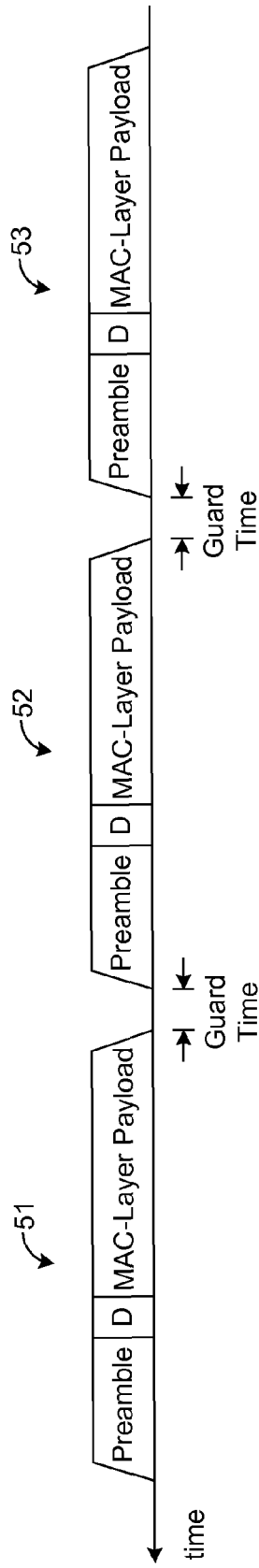
FIG. 2 is a timing diagram for a plurality of upstream burst transmissions communicated to the OLT depicted by FIG. 1.

FIG. 2 is a timing diagram illustrating three consecutive upstream burst transmissions from three different ONUs 28, respectively. In this regard, a first ONU 28 transmits an upstream burst transmission 51, a second ONU 28 transmits an upstream burst transmission 52, and a third ONU 28 transmits an upstream burst transmission 53. As shown by FIG. 2, each burst transmission 51-53 has a preamble and a delimiter (D) that is followed by MAC-layer payload, which may include both overhead and packet data. Between each burst transmission 51-53 is a period, referred to as "guard time," during which none of the ONUs 28 are permitted to transmit across the fiber 33. Such guard times help to prevent data collisions by providing quiet periods between burst transmissions. As shown by FIG. 2, the OLT 25 controls the timing of burst transmissions from the ONUs 28 such that the burst transmissions 51-53 are non-overlapping. That is, the upstream burst transmissions are serially transmitted across the fiber 33 without one burst interfering with the other bursts.

Figure 3:
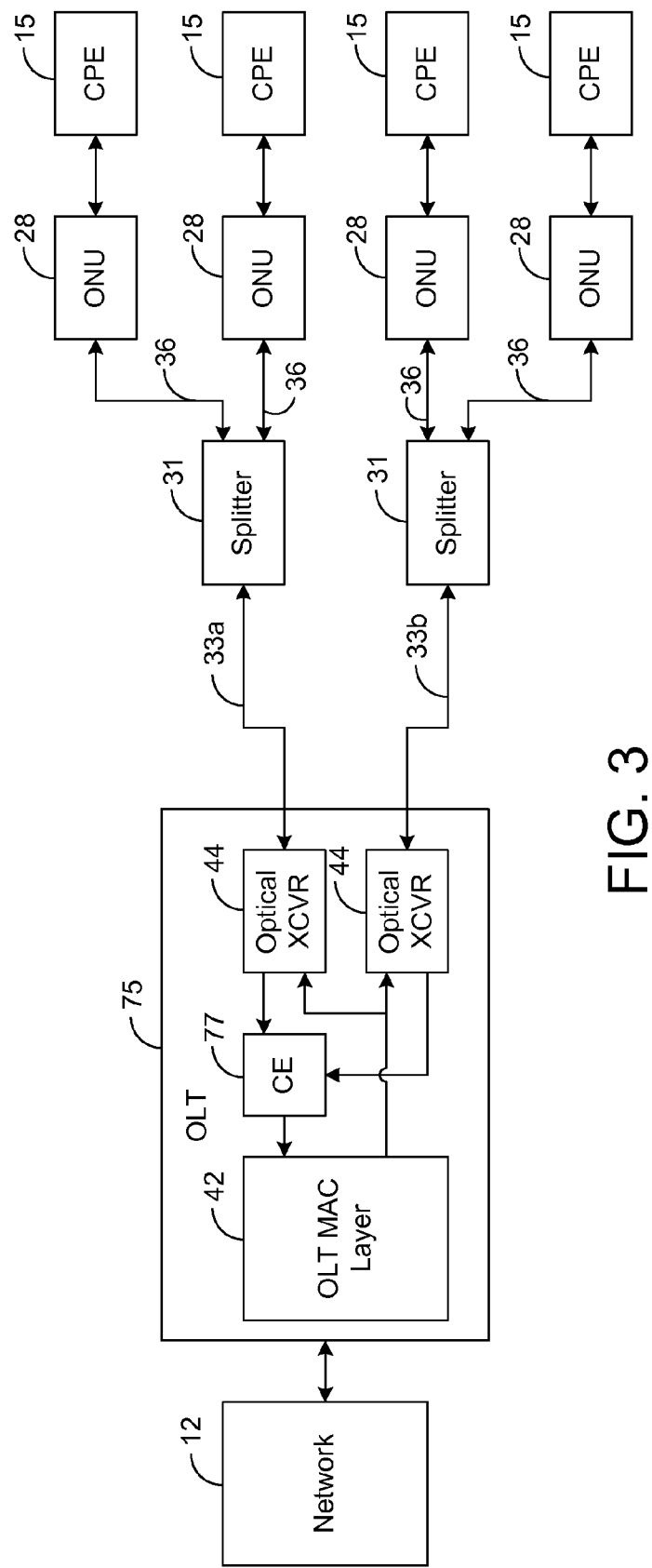
FIG. 3 is a block diagram illustrating a conventional communication system having an OLT split across a plurality of optical fibers.

FIG. 3 depicts another conventional communication system 70 that is similar to the system 10 shown by FIG. 1 except that an OLT 75 is coupled to and communicates across multiple fibers 33a, 33b. Specifically, the analog signal from the OLT MAC layer 42 is provided to a plurality of optical transceivers 44, and each transceiver 44 is coupled to a respective fiber 33a, 33b. FIG. 3 shows two transceivers 44 and two fibers 33a, 33b for simplicity, but any number of transceivers 44 and fibers 33a, 33b may be used in other embodiments.

In the downstream direction, since the same analog signal is provided to each optical transceiver 44, the same optical downstream signal is transmitted through each optical fiber 33a, 33b. However, each transceiver 44 is optically coupled to only a subset (less than all) of the ONUs 28 of the PON. In the example shown where two optical transceivers 44 are used, one transceiver 44 may be optically coupled to half of the ONUs 28 through a first splitter 31, and the other transceiver 44 may be optically coupled to the other half of the ONUs 28 through a second splitter 31. Thus, the transmit power required for each optical transceiver 44 of FIG. 3 is less than the transmit power required for the optical transceiver 44 of FIG. 1, and less expensive components, such as lasers, may be used for the transceivers 44 of FIG. 3 relative to the transceiver 44 of FIG. 1.

In the upstream direction, each OLT transceiver 44 receives burst transmissions only from the ONUs 28 to which the respective transceiver 44 is coupled. Since there are fewer feeds to the splitter 31 to which a given ONU 28 is coupled, the transmit power required for an ONU 28 to transmit an upstream signal through a splitter 31 to its respective OLT transceiver 44 is reduced relative to the transmit power required for the ONUs depicted by FIG. 1 (assuming the same number of ONUs 28 in both embodiments). Thus, less expensive components, such as lasers, may be used for the ONUs 28 of FIG. 3 relative to the ONUs 28 of FIG. 1.

Figure 4:
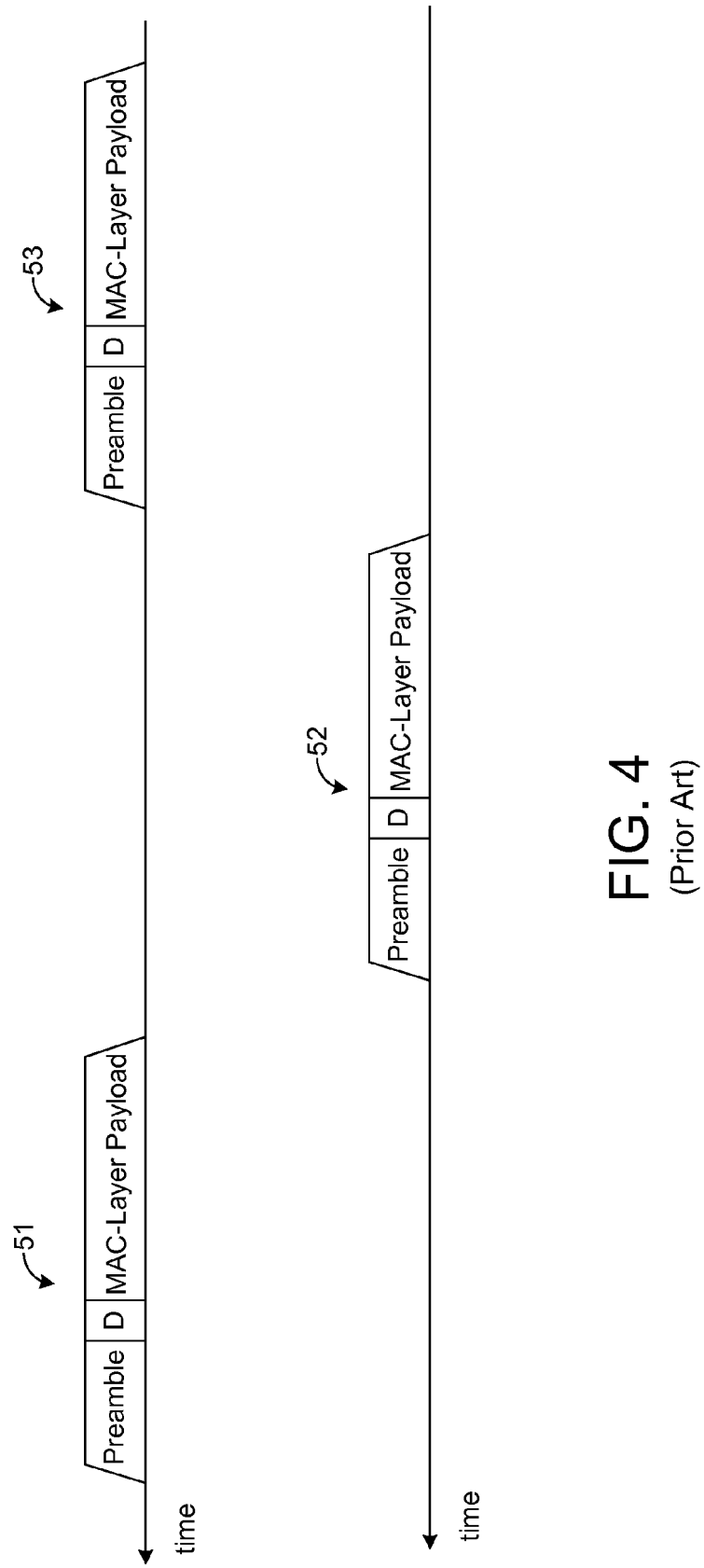
FIG. 4 is a timing diagram for a plurality of upstream burst transmissions communicated to the OLT depicted by FIG. 3.

FIG. 4 is a timing diagram illustrating the same three upstream burst transmissions 51-53 described above. As can be seen by comparing FIG. 4 to FIG. 2, the burst transmissions 51-53 are communicated in the same non-overlapping manner, as described above for FIG. 2, but the burst transmission 52 is transmitted across a different fiber 33b relative to the burst transmissions 51 and 53. As shown by FIG. 3, the output of each OLT transceiver 44 is fed to a combiner element 77, such as a multiplexer or a logical OR function, that combines the upstream bursts 51-53 so that the bursts 51-53 are fed serially to the OLT MAC layer 42 according to the timing diagram shown by FIG. 2. The use of multiple OLT transceivers 44 and fibers 33a, 33b is transparent to the ONUs 28 and the OLT MAC layer 42. While the transmit power requirements are reduced for the system 70 shown by FIG. 3, the capacity and throughput of the system 70 are the same as the capacity and throughput of the system 10 depicted by FIG. 1.

Figure 5:
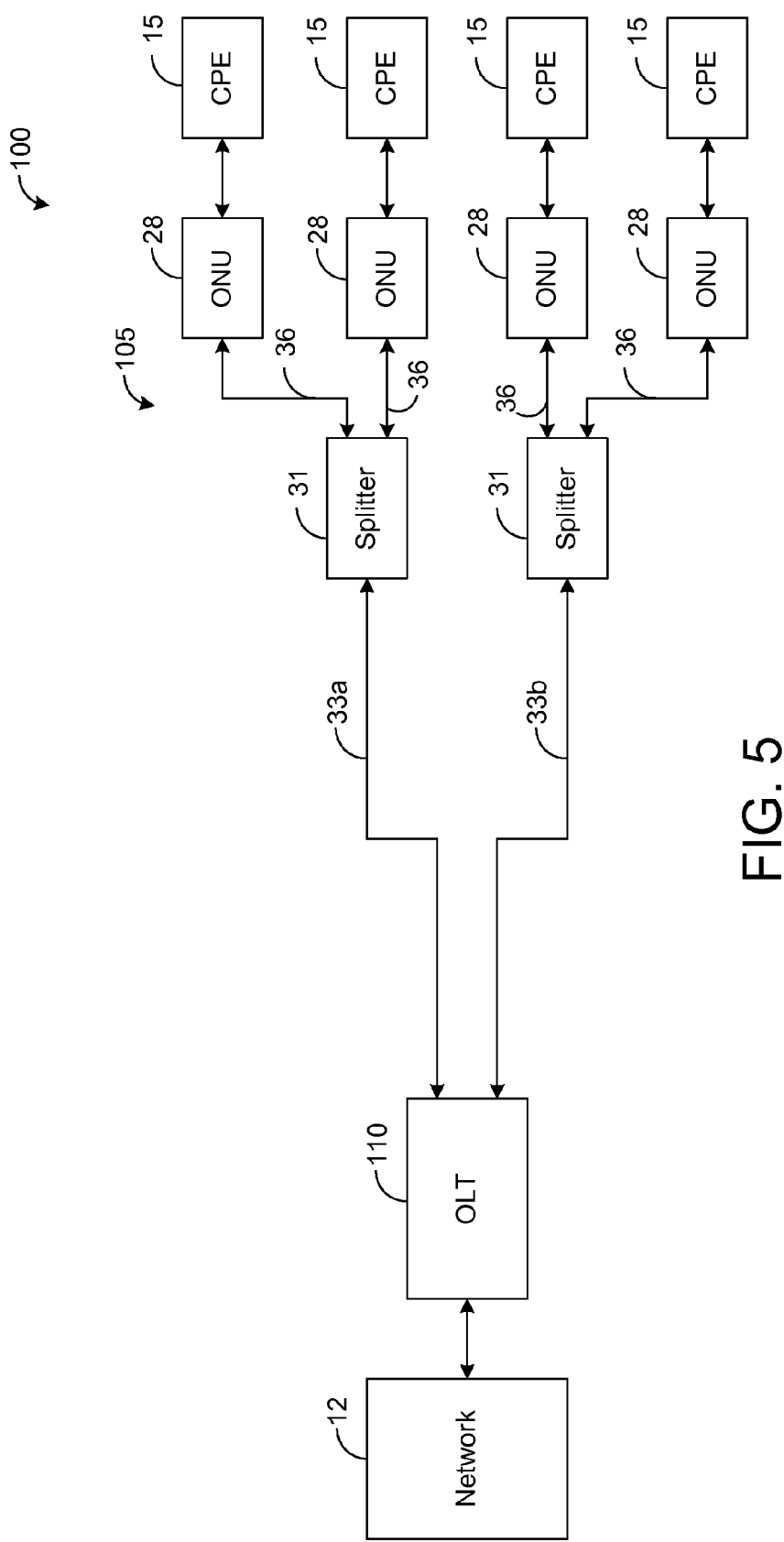
FIG. 5 is a block diagram illustrating an exemplary communication system having an OLT digitally split across a plurality of optical fibers.

FIG. 5 depicts an exemplary embodiment of a communication system 100 that has a PON 105 (or other type of optical network) for communicating between a network 12 and a plurality of CPE 15. The network side of the PON 105 has an OLT 110 that is digitally split across multiple optical fibers 33a, 33b for communicating with a plurality of ONUs 28 on a customer side of the PON 105. In this regard, except as is otherwise described hereafter, the system 100 of FIG. 5 is configured and operates the same as the conventional system 70 shown by FIG. 3. Thus, the OLT 110 is coupled to multiple fibers 33a, 33b, and the same downstream signal is transmitted by the OLT 110 through each of the fibers 33a, 33b. Further, the OLT 110 has multiple optical transceivers (not specifically shown in FIG. 5) that are optically coupled to a subset (less than all) of the ONUs 28 in the PON 105. Thus, the system 100 can realize the same or similar reductions in transmit power as the conventional system 70. However, the OLT 100 is digitally split across multiple fibers 33a, 33b in order to realize various performance enhancements, such as increased capacity and throughput relative to the conventional system 70 shown by FIG. 3.

Figure 6:
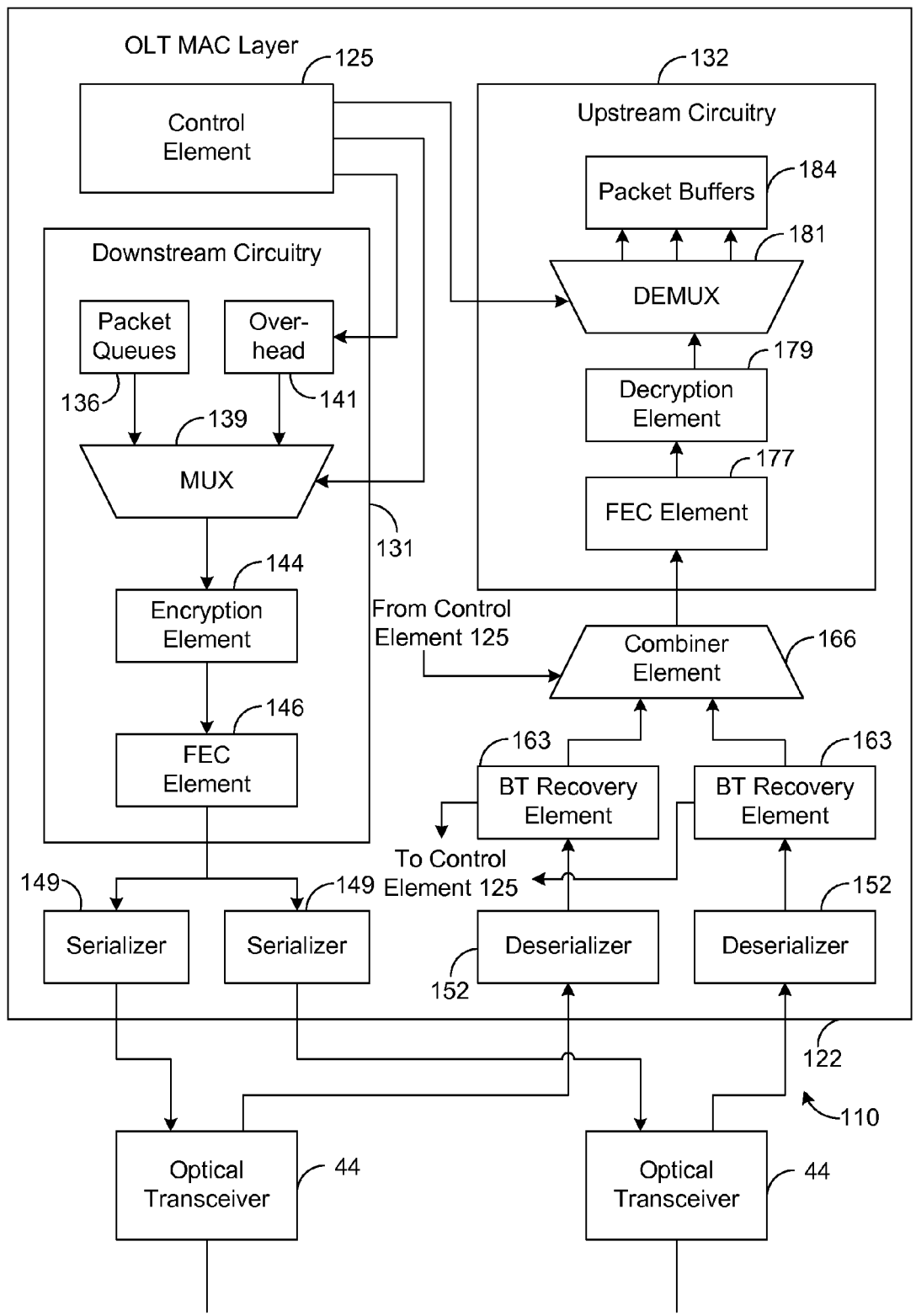
FIG. 6 is a block diagram illustrating an exemplary embodiment of the OLT depicted by FIG. 5.

FIG. 6 depicts an exemplary embodiment of the OLT 110. The OLT 110 has a MAC layer 122 that is coupled to a plurality of optical transceivers 44, which are physical-layer devices for performing conversions between the electrical domain and the optical domain, as known in the art. The OLT MAC layer 122 has a control element 125 for generally controlling the operation of the OLT 110. As an example, the control element 125 may communicate with the ONUs 28 via a control channel in order to control the timing of burst transmissions across the PON 105 according to known techniques. The control element 125 may also control the flow of data within the OLT 125. The control element 125 may be implemented in hardware, software, firmware, or any combination thereof. In one exemplary embodiment, the control element 125 comprises a processor with software executing on the processor for performing the functions of the control element 125, but other configurations of the control element 125 are possible in other embodiments.

As shown by FIG. 6, the OLT MAC layer 122 comprises downstream circuitry 131 and upstream circuitry 132 for respectively transmitting and receiving packets to and from the PON 105. The downstream circuitry 131 and the upstream circuitry 132 may be implemented exclusively in hardware or a combination of hardware with software and/or firmware, such as a processor executing software or firmware. In one exemplary embodiment, the downstream circuitry 131 and upstream circuitry 132 are implemented in hardware as a field programmable gate array (FPGA), but other configurations of the downstream circuitry 131 and upstream circuitry 132 are possible in other embodiments.

The downstream circuitry 131 comprises a plurality of packet queues 136 for buffering data packets to be transmitted across the PON 105 to the ONUs 28 and ultimately to the CPE 15. In this regard, each data packet received from the network 12 may have a destination address specifying a CPE 15 that is to receive the packet, generally referred to hereafter as the packet's destination CPE 15. When a packet is selected for transmission across the PON 105, the packet is transmitted to a multiplexer 139, which combines the packet with overhead information 141 of the MAC layer 122, as is known in the art. Specifically, frame alignment, data link, and management overhead are transmitted periodically to maintain the communication link with all ONUs 28 and to allocate time division multiplexing (TDM) bandwidth for ONU upstream transmission. Following the overhead, packets are sent toward the ONUs 28, with additional overhead information added to each packet to determine the length of the packet and its destination ONU(s) 28.

The downstream transmission output from the multiplexer 139 is encrypted by an encryption element 144. In this regard, the transmission is received by an encryption element 144, and the encryption element 144 is configured to optionally encrypt packets in the downstream transmission according to techniques known in the art such that the ONU 28 within the path of the destination CPE 15 for the packets in the transmission can receive and decrypt the transmission in order to recover the data packets. However, the encryption prevents the other ONUs 28 from successfully recovering such data packets, thereby protecting the packets from unauthorized access.

After encryption, the transmission is processed by forward error correction (FEC) circuitry 146, which adds FEC information to the transmission, according to techniques known in the art, so that receiving ONU 28 can correct up to a certain number of transmission errors depending on the type and amount of FEC information added.

As shown by FIG. 6, the FEC circuitry 146 sends the transmission to each of a plurality of serializers 149 that are respectively coupled to optical transceivers 44. Note that FIG. 6 shows two optical transceivers 44 for simplicity, but the OLT 110 may have any number of optical transceivers 44 in other embodiments. Each serializer 149 is configured to serialize the transmission for communication across the PON 105, and the serializer 149 is configured to modulate an analog signal with the serialized transmission. The optical transceiver 44 receiving such modulated signal is configured to convert the signal from the electrical domain to the optical domain, thereby defining an optical data signal for transmission through the optical fiber 33a, 33b coupled to it.

When a packet is to be transmitted by an ONU 28 in the upstream direction, the ONU 28 transmits an optical signal over the PON 105 toward the OLT 110 containing overhead and packet data. Specifically, a preamble and a delimiter are added to the packet. The preamble is a sequence of known data that is transmitted by an ONU 28 to enable the OLT 110 to acquire and synchronize to the transmission burst, and the delimiter is a set of data that marks the beginning of a portion of the transmission burst, referred to herein as the "MAC-layer payload," that the OLT MAC layer 122 treats as payload. Such MAC-layer payload includes data packets to be communicated to the OLT 110. For a given upstream burst transmission, the transmitting ONU 28 essentially encapsulates a group of data packets with MAC-layer overhead (e.g., preamble and delimiter) to be used by the OLT 110 for acquiring and synchronizing to the transmission burst and for finding the MAC-layer payload portion of the transmission burst. Note that the MAC-layer overhead may include various types of control information in addition to a preamble and a delimiter. As an example, the MAC-layer overhead may include control information that is communicated between the OLT 110 and the ONUs 28 for informing the OLT 110 of load conditions at the ONUs 28, as described in more detail herein.

Each of the optical transceivers 44 in the OLT 110 receives upstream burst transmissions from the optical fiber 33a, 33b to which it is coupled. Each transceiver 44 is also coupled to a respective deserializer 152 to which the transceiver 44 sends the upstream burst transmissions. Each deserializer 152 deserializes the upstream burst transmissions received by it and transmits digital words (e.g., bytes) of each such deserialized burst transmission to a burst-transmission recovery element 163. The burst-transmission (BT) recovery element 163 may be implemented exclusively in hardware or a combination of hardware with software and/or firmware, such as a processor executing software or firmware. In one exemplary embodiment, the BT recovery element 163 is implemented in hardware as an FPGA, but other configurations of the element 163 are possible in other embodiments.

When the BT recovery element 163 receives a burst transmission, the element 163 is configured to strip away MAC-layer overhead and to provide at least a portion of such overhead to the control element 125 for processing. Each upstream burst transmission includes a preamble and a delimiter that have been added to the burst transmission by the MAC layer of the transmitting ONU 28. The BT recovery element 163 is configured to acquire and synchronize to the upstream burst transmission based on the preamble and to identify the start of the MAC-layer payload portion of the burst transmission based on the delimiter. The BT recovery element 163 also removes the preamble and the delimiter from the upstream burst transmission such that only the MAC-layer payload portion of the BT recovery element 163 is passed to a combiner element 166, such as a multiplexer or a logical OR function.

The combiner element 166 transmits an input feed from one of the BT frame recovery elements 163 for transmission to the upstream circuitry 132. That is, the combiner element 166 has multiple input feeds (where each feed is from a respective one of the BT recovery elements 163) and, at any given time, the combiner element 166 outputs only one of such feeds. In this regard, for the embodiment shown by FIG. 6, the control element 125 controls the timing of upstream burst transmissions such that the MAC-layer payload portions of such transmissions are non-overlapping when transmitted across the PON 105, but portions of the guard time, preamble, and delimiter for an upstream burst transmission on one fiber may overlap with any portions of other upstream burst transmissions on a different fiber.

Figure 7:
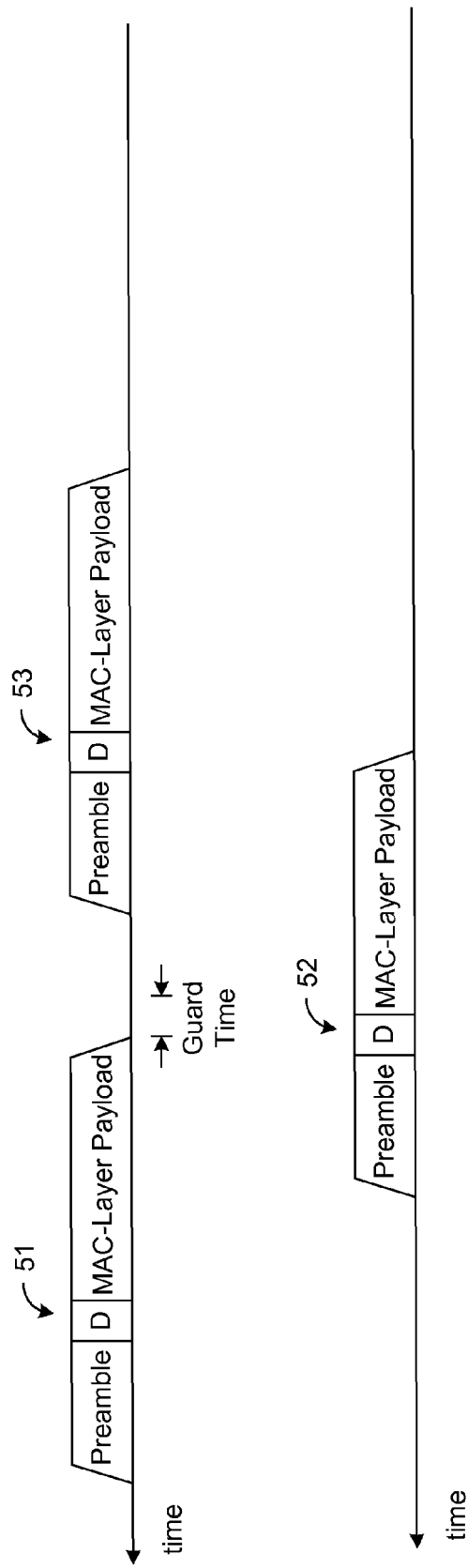
FIG. 7 is an exemplary timing diagram for a plurality of upstream burst transmissions communicated to the OLT depicted by FIG. 6.

In this regard, refer to FIG. 7, which shows an exemplary timing diagram for upstream burst transmissions 51-53 received by the OLT 110 depicted by FIG. 6. As shown by FIG. 7, the burst transmission 51 is transmitted by a first ONU 28 across optical fiber 33*a*, and the burst transmission 52 is transmitted by a second ONU 28 across optical fiber 33*b*. Further, the burst transmission 53 is transmitted by a third ONU 28 across the same optical fiber 33*a* as the burst transmission 51. Also, the timing of the burst transmissions 51-53 is controlled such that the MAC-layer payload portion of a given upstream burst transmission does not overlap in time with the MAC-layer payload portion of any other transmission bursts. Specifically, the MAC-layer payload portion of burst transmission 51 is transmitted across the optical fiber 33*a*, and the MAC-layer payload portion of the burst transmission 52 is subsequently transmitted across the optical fiber 33*b* with guard time between the end of burst transmission 51 and the beginning of the MAC-layer payload within burst transmission 52. Thereafter, the MAC-layer payload portion of the burst transmission 53 is transmitted across the optical fiber 33*a* (i.e., the same fiber 33*a* that carried the burst transmission 51) with a guard time between the burst transmissions 52 and 53. Thus, the MAC-layer payload portions of the upstream burst transmissions 51-53 should be received by the OLT 110 and ultimately the combiner element 166 one at a time. Specifically, the combiner element 166 should receive the MAC-layer payload portion of the burst transmission 51 from one input feed, then the MAC-layer payload portion of the burst transmission 52 from another input feed, and finally the MAC-layer payload portion of the burst transmission 53 from the same input feed as burst transmission 51.

As shown by FIG. 7, while the MAC-layer payload portions of the upstream burst transmissions are non-overlapping, the MAC-layer overhead (e.g., preamble and delimiter) on one of the fibers 33*a*, 33*b* may overlap in time with any portion (e.g., MAC-layer overhead or MAC-layer payload) of other burst transmissions transmitted through the other fiber. As an example, in FIG. 7, the MAC-layer overhead of burst transmission 52 is shown as overlapping with the MAC-layer payload portion of burst transmission 51, and the MAC-layer overhead of burst transmission 53 is shown as overlapping with the MAC-layer payload portion of burst transmission 52. Note that the combiner element 166 does not receive the MAC-layer overhead (e.g., the preamble and delimiter) of the burst transmissions 51-53 since the BT recovery elements 163 strip this information prior to the combiner element 166. Accordingly, the overlapping of MAC-layer overhead on one fiber 33*a* with a burst transmission on the other fiber 33*b* should not cause any collisions or overruns at the combiner element 166.

As shown by FIG. 6, when a MAC-layer payload portion is output by the combiner element 166, such MAC-layer payload portion is received by an FEC element 177 that uses known FEC techniques in order to correct for any transmission errors in the received payload portion. A decryption element 179 receives the corrected payload portion and, if the payload portion has been encrypted by the transmitting ONU 28, decrypts the payload portion. The MAC-layer payload portion is then transmitted to a demultiplexer 181 that demultiplexes the MAC-layer payload portion for storage into a plurality of packet buffers 184. Although not shown in FIG. 6, an optional decryption circuit could be added in the upstream path so that upstream transmissions may be encrypted in order to enhance security for the PON 105 upstream data path as well.

Accordingly, in the embodiment depicted by FIG. 6, the circuitry of the BT recovery element 163 is duplicated for each optical transceiver 44 within the OLT 110. Thus, where there are two transceivers 44, as shown by FIG. 6, there are two BT recovery elements 163 for recovering upstream burst transmissions. However, by incurring costs of such duplicative circuitry, certain performance benefits are realized. For example, the capacity and throughput of the PON 105 is increased since the MAC-layer overhead on a given fiber 33*a*, 33*b* can overlap with burst transmissions being transmitted across the other fiber 33*a*, 33*b*. However, the amount of performance increase is still limited by the restraint of keeping the MAC-layer payload portions non-overlapping with each other in order to prevent collisions or overruns at the combiner element 166.

As indicated above, the control element 125 is configured to communicate with the ONUs 28 via a control channel in order to control the timing of upstream burst transmissions. In this regard, each ONU 28 communicates over this control channel to inform the control element 125 how much upstream data is ready for transmission at such ONU 28, and the control element 125 allocates bandwidth among the ONUs 28 based on such information, as well as other factors, such as prioritization. The control element 125 also uses the control channel to instruct the ONUs 28 when to transmit in the upstream direction. As an example, the control element 125 may transmit a data structure, referred to herein as a "bandwidth map," that indicates which ONUs 28 are permitted to transmit upstream for a set of time slots over a given time period. The bandwidth map correlates each upstream time slot with the identifier of the ONU 28 that is permitted to transmit upstream during that time slot. Further, the control element 125 defines the bandwidth map in order to implement the timing schemes described herein. For example, referring to FIG. 7, the control element 125 defines the bandwidth map so that the MAC-layer payload portions are non-overlapping, as described above, but the MAC-layer overhead on one optical fiber 33*a*, 33*b* overlaps with upstream burst transmissions on the other optical fiber 33*a*, 33*b*.

In addition, when there is upstream data to transmit across multiple fibers 33a, 33b, the control element 125 preferably allocates bandwidth across the fibers 33a, 33b in an alternating fashion. That is, the control element 125 ensures that an upstream burst transmission on one optical fiber 33a, 33b occurs between successive upstream transmissions on the other optical fiber 33a, 33b. As an example, in FIG. 7, the upstream burst transmission 52 on the optical fiber 33b is between two successive upstream burst transmissions 51, 53 on the optical fiber 33a. Transmitting across the fibers 33a, 33b in such an alternating fashion helps to increase the throughput and the capacity of the PON 105 since there is a greater amount of overlap of MAC-layer overhead portions of the transmissions. As an example, in FIG. 7, the MAC-layer overhead portion of the upstream burst transmission 52 overlaps with a portion of the upstream burst transmission 51, and the MAC-layer overhead portion of the upstream burst transmission 53 overlaps with a portion of the upstream burst transmission 52. If consecutive upstream burst transmissions 51, 53 on the same fiber 33a are instead communicated with no upstream burst transmission 52 on a different fiber in between the consecutive transmissions 51, 53, then there would be no overlap during the time period that the transmissions 51, 53 are being communicated across the optical fiber 33a. Allocating bandwidth across multiple fibers 33a, 33b in an alternating fashion, as described above, helps to maximize the degree of overlap between transmissions on one fiber 33a, 33b with the transmissions on another fiber 33a, 33b, thereby helping to improve throughput and capacity.

Note that, in order to control the timing of the upstream burst transmissions as described herein, such as allocating bandwidth in an alternating fashion or ensuring that there are no data collisions or overruns, the control element 125 is preferably aware of which respective fiber 33a, 33b each of the ONUs 28 is on. If desired, such information may be provisioned into the OLT 110. In one exemplary embodiment, the control element 125 dynamically determines the topology of the PON and, specifically, which ONUs 28 are coupled to which optical fibers 33a, 33b based on communications between the OLT 110 and the ONUs 28.

In this regard, each ONU 28 is configured to register with the OLT 110 by randomly or pseudo-randomly attempting to transmit a registration message to the OLT 110, and such registration message includes an identifier (e.g., serial number) of the ONU 28. Periodically, such as once every 30 seconds or so, the control element 125 provides a ranging window whereby none of the registered ONUs 28 are permitted to transmit upstream thereby allowing unregistered ONUs 28 to successfully communicate registration messages with the OLT 110 without such registration messages colliding with upstream transmissions from the registered ONUs 28. The registration message is received by the BT recovery element 163 that is coupled to the optical fiber 33a, 33b over which the message is communicated, and such BT recovery element 163 communicates the message to the control element 125. Upon receiving a registration message from an unregistered ONU 28, the control element 125 is configured to store the ONU's identifier in memory, thereby registering the ONU 28 with the OLT 110, and to thereafter allocate bandwidth to the newly-registered ONU 28. During such registration, the control element 125 is configured to determine from which optical fiber 33a, 33b the registration message was received and to correlate the ONU 28 with such optical fiber 33a, 33b. Based on such stored information, the control element 125 is aware of which fiber 33a, 33b is respectively coupled to each ONU 28, and the control element 125 uses such information in defining the bandwidth map to control the timing of the upstream burst transmissions, as described herein.

Note that splitting the OLT 110 across multiple fibers 33a, 33b, as described herein, has the benefit of reducing the likelihood of collisions of registration messages. Specifically, since fewer ONUs 28 are coupled to each respective fiber 33a, 33b relative to an embodiment that uses a single fiber 33, the likelihood of multiple ONUs 28 randomly or pseudo-randomly attempting to transmit registration messages across the same fiber 33a, 33b at the same time is reduced. The control element 125 is preferably configured to receive registration messages from each of the BT recovery elements 163 separately so that it can simultaneously receive multiple registration messages carried by multiple fibers 33a, 33b.

Figure 8:
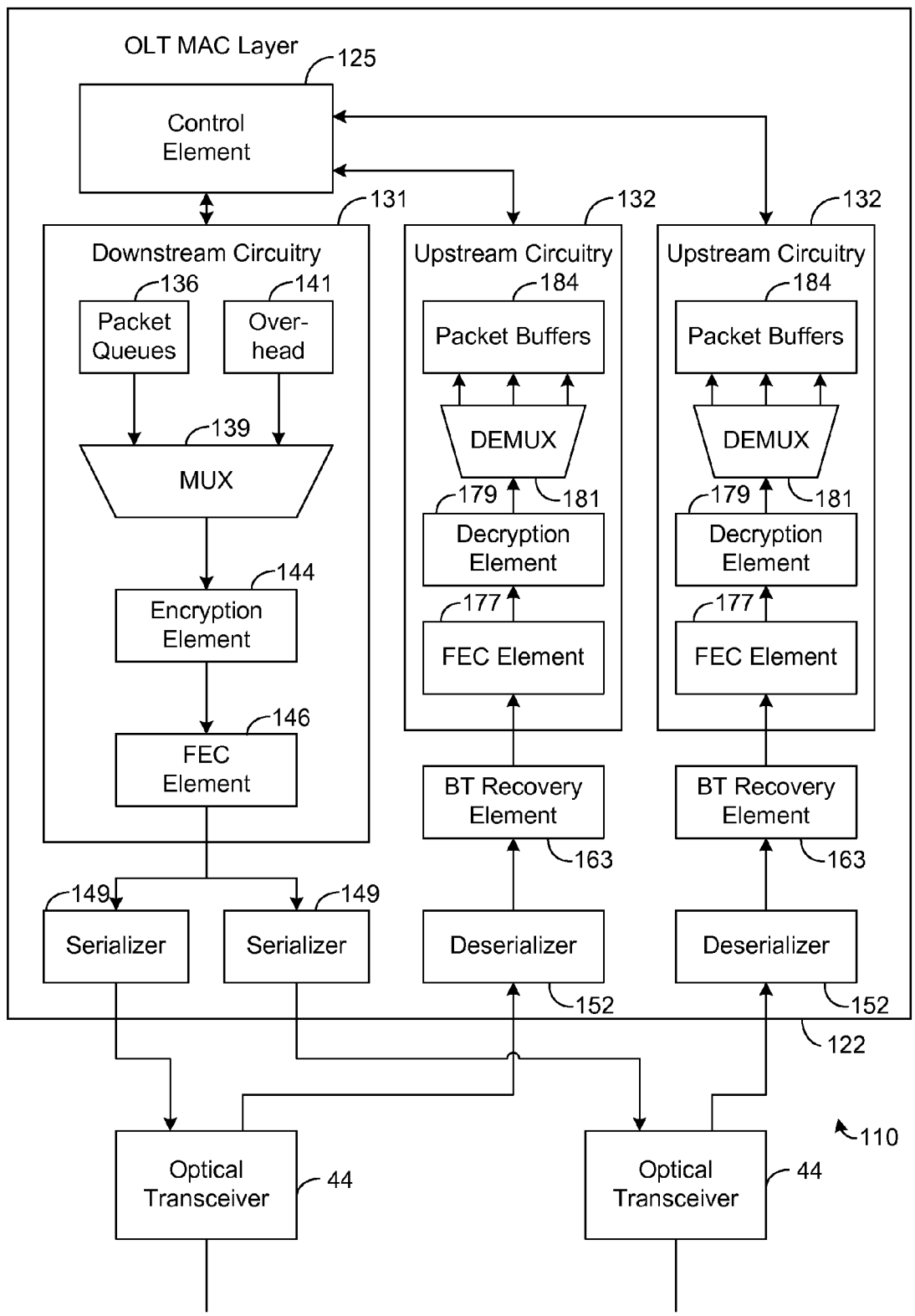
FIG. 8 is a block diagram illustrating an exemplary embodiment of the OLT depicted by FIG. 5.

FIG. 8 depicts another embodiment of the OLT 110 that is depicted by FIG. 5. Except as will be otherwise described below, the configuration and operation of the OLT 110 depicted by FIG. 8 are the same as the configuration and operation of the OLT 110 depicted by FIG. 6. As shown by FIG. 8, the upstream circuitry 132 is duplicated for each optical transceiver 44 within the OLT 110. Thus, where there are two transceivers 44, as shown by FIG. 8, there are two sets of upstream circuitry 132 (one for each transceiver 44). In FIG. 8, two transceivers 44 and two sets of upstream circuitry 132 are shown for simplicity, but other numbers of transceivers 44 and sets of upstream circuitry 132 are possible in other embodiments.

When an upstream burst transmission is received by an optical transceiver 44, the transceiver 44 sends the burst transmission through an upstream path that includes the deserializer 152, the BT recovery element 163, and set of upstream circuitry 132 that are coupled to the optical transceiver 44. Thus, each upstream burst transmission communicated across optical fiber 33a is processed by one set of upstream circuitry 132 while each upstream burst transmission communicated across optical fiber 33b is processed by the other set of upstream circuitry 132, thereby permitting an upstream burst transmission on optical fiber 33a to overlap with an upstream burst transmission on optical fiber 33b. In this regard, since the upstream burst transmissions on one optical fiber 33a are processed by a separate upstream path in the OLT MAC layer 122 relative to the upstream path used to process upstream burst transmissions on the other optical fiber 33b, data collisions or overruns in the OLT MAC layer 122 are prevented even if upstream burst transmissions are simultaneously transmitted across both optical fibers 33a, 33b. Note that since separate upstream paths are used in the OLT MAC layer 122, there is no need to have a combiner element 166, as shown by FIG. 6.

Figure 9:
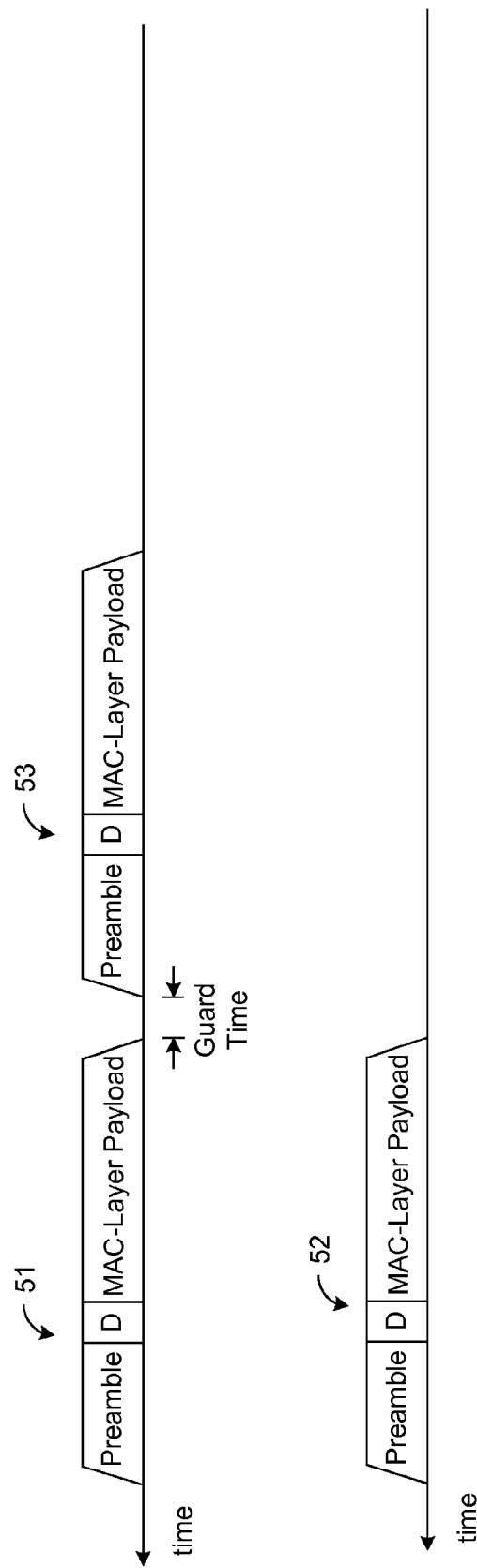
FIG. 9 is an exemplary timing diagram for a plurality of upstream burst transmissions communicated to the OLT depicted by FIG. 8.

FIG. 9 shows an exemplary timing diagram for upstream burst transmissions 51-53 received by the OLT 110 depicted by FIG. 8. As shown by FIG. 9, the burst transmission 51 is transmitted by a first ONU 28 across optical fiber 33a, and the burst transmission 52 is transmitted by a second ONU 28 across optical fiber 33b. Further, the burst transmission 53 is transmitted by a third ONU 28 across the same optical fiber 33a as the burst transmission 51. Any portion of an upstream burst transmission on one optical fiber 33a may overlap with any portion of an upstream burst transmission on the other optical fiber 33b. As an example, FIG. 9 shows that the entire portion of the upstream burst transmission 52 overlaps with the upstream burst transmission 51. That is, the upstream burst transmission 52 is transmitted across the optical fiber 33b as the upstream burst transmission 51 is simultaneously transmitted across the optical fiber 33a. In such embodiment, the upstream burst transmissions 51 and 52 are simultaneously received by the OLT 110. In the OLT MAC layer 122, the upstream burst transmission 52 is processed by one upstream path (including a deserializer 152, a BT recovery element 163, and a upstream circuitry 132) while the upstream burst transmission 51 is simultaneously processed by another upstream path.

Since an upstream burst transmission on one optical fiber 33*a*, 33*b* does not restrain or limit when data may be transmitted across another optical fiber 33*a*, 33*b*, the upstream throughput and capacity of the PON 105 is increased when the OLT 110 is implemented according to the embodiment depicted by FIG. 8 relative to the embodiment depicted by FIG. 6, and increases proportionally to the number of optical transceivers 44 relative to the prior art depicted by FIG. 4.

In the embodiment depicted by FIG. 8, the control element 125 is configured to communicate with the ONUs 28 across a control channel in order to control a timing of the upstream burst transmissions, as described above. If desired, the control element 125 may transmit a bandwidth map across the optical fiber 33*a* for the ONUs 28 coupled to such fiber 33*a*, and the control element 125 may transmit a separate bandwidth map across the optical fiber 33*b* for the ONUs 28 coupled to such fiber 33*b*. In such an embodiment, it may be desirable to keep the lengths of all of the bandwidth maps equal so that MAC-layer payload may be commenced across each fiber 33*a*, 33*b* at the same time following transmission of the bandwidth maps. If a bandwidth map is shorter than the longest bandwidth map being sent, then "dummy" values may be added to the shorter bandwidth map so that its length matches the longest bandwidth map.

In one exemplary embodiment, rather than transmitting separate bandwidth maps, the control element 125 is configured to concatenate the bandwidth maps for multiple fibers 33*a*, 33*b* and to transmit a single bandwidth map across both fibers 33*a*, 33*b*. That is, the transmitted bandwidth map indicates when each ONU 28 is to transmit upstream regardless of which optical fiber 33*a*, 33*b* is coupled to such ONU 28. Such a technique may help to simplify the downstream circuitry 131 at the OLT 131 since the same downstream control information may be transmitted across all fibers 33*a*, 33*b*. As an example, the bandwidth map may be sent across both fibers 33*a*, 33*b* simultaneously, and such bandwidth map may be immediately followed by MAC-layer payload that is also distributed across both fibers 33*a*, 33*b* simultaneously.

Since the transmitted bandwidth map defines the upstream slots for all of the ONUs 28 communicating across the PON, there will be overlaps in the bandwidth map. Specifically, for a given time period, the bandwidth map will indicate that multiple ONUs 28 are permitted to simultaneously transmit upstream. As an example, referring to FIG. 9, the bandwidth map for a given time slot will indicate that one ONU 28 is permitted to transmit the upstream burst transmission 51 and that another ONU 28 is also permitted to transmit the upstream burst transmission 52 during the same time slots. In this regard, the bandwidth map may correlate the identifiers of both ONUs 28 with the same time slots. However, such a bandwidth map does not actually result in data collisions or cause any errors at the ONUs 28. In this regard, each ONU 28 is designed to respond to its own ONU identifier in the bandwidth map and to ignore the other ONU identifiers. Further, in such an embodiment, each ONU 28 permitted to transmit during the same time slot by the bandwidth map should be coupled to a different optical fiber 33*a*, 33*b*. Thus, each ONU 28 that is correlated with the same time slot responds to the bandwidth map by transmitting upstream during this time slot, but the transmissions from such ONUs 28 traverse across different fibers 33*a*, 33*b* and are processed by different sets of upstream circuitry 132 such that there are no data collisions.

In the various embodiments described above, it would be generally ideal if the same number of ONUs 28 is coupled to each optical fiber 33*a*, 33*b*. However, in practice, such may not be the case as there may be a higher number of ONUs 28 coupled to one optical fiber 33*a*, 33*b* than the number of ONUs 28 coupled to the other fiber 33*a*, 33*b*. In one exemplary embodiment, during congestion, the control element 125 is configured to ensure a fair allocation of bandwidth across the ONUs 28 regardless of which ONUs 28 are coupled to which optical fiber 33*a*, 33*b*. That is, in allocating bandwidth to any one ONU 28, the control element 125 considers the upstream demand, requirements, and priorities of all of the other ONUs 28 on the PON.

For example, assume that there are five ONUs 28 transmitting upstream transmissions of equal priority and that the maximum capacity in the upstream direction is 1 gigabits per second (Gb/s). Further assume that one of the ONUs 28 is coupled to fiber 33*a* and that the other four ONUs 28 are coupled to fiber 33*b*. In such an example, the control element 125 may fairly allocate bandwidth such that each of the five ONUs 28 is permitted to transmit across the PON at the same rate (i.e., 200 megabits per second (Mb/s) in this example). Without fair allocation, the single ONU 28 coupled to the fiber 33*a* may receive a disproportionately high allocation of the bandwidth.

In several exemplary embodiments described above, an OLT is described as being split across two fibers 33*a*, 33*b*. It should be emphasized that, in other embodiments, an OLT may be split across any number of fibers using the techniques and concepts described herein.

Now, therefore, the following is claimed:

1. An optical line terminal, comprising:
   a first optical transceiver configured to transmit a downstream optical signal across a first optical fiber coupled to the first optical transceiver, the first optical transceiver further configured to receive a first burst transmission from the first optical fiber;
   a second optical transceiver configured to transmit the downstream optical signal across a second optical fiber coupled to the second optical transceiver, the second optical transceiver further configured to receive a second burst transmission from the second optical fiber;
   a first burst-transmission recovery element coupled to the first optical transceiver and configured to receive the first burst transmission from the first optical transceiver, the first burst-transmission recovery element configured to recover a first media access control-layer (MAC-layer) payload portion of the first burst transmission based on a first preamble and a first delimiter of the first burst transmission, the first burst-transmission recovery element configured to strip the first preamble and the first delimiter from the first MAC-layer payload portion and to transmit first digital words defining the first MAC-layer payload portion;
   first upstream circuitry configured to buffer a plurality of data packets of the first MAC-layer payload portion based on the first digital words; and
   a second burst-transmission recovery element coupled to the second optical transceiver and configured to receive the second burst transmission from the second optical transceiver, the second burst-transmission recovery element configured to recover a second MAC-layer payload portion of the second burst transmission based on a second preamble and a second delimiter of the second burst transmission, the second burst-transmission recovery element configured to strip the second preamble and the second delimiter from the second MAC-layer payload portion and to transmit second digital words defining the second MAC-layer payload portion.

2. The optical line terminal of claim 1, wherein the optical line terminal is configured to control a timing of the first and second burst transmissions across the first and second optical fibers, respectively, such that the first MAC-layer payload portion is non-overlapping with respect to the second MAC-layer payload portion and such that the first preamble overlaps with at least a portion of the second burst transmission.

3. The optical line terminal of claim 1, wherein the optical line terminal is configured to control a timing of the first and second burst transmissions across the first and second optical fibers, respectively, such that the first burst transmission overlaps with respect to the second burst transmission.

4. The optical line terminal of claim 1, further comprising a combiner element coupled to the first and second burst-transmission recovery elements.

5. The optical line terminal of claim 1, wherein the first upstream circuitry is configured to buffer a plurality of data packets of the second MAC-layer payload portion based on the second digital words.

6. The optical line terminal of claim 5, wherein the optical line terminal is configured to control a timing of the first and second burst transmissions across the first and second optical fibers, respectively, such that the first optical transceiver receives the first preamble simultaneously with the second optical transceiver receiving a portion of the second burst transmission.

7. The optical line terminal of claim 1, further comprising second upstream circuitry configured to buffer a plurality of data packets of the second MAC-layer payload portion based on the second digital words.

8. The optical line terminal of claim 7, wherein the first upstream circuitry comprises a first forward error correction (FEC) element configured to receive the first MAC-layer payload portion and to correct errors in the first MAC-layer payload portion, and wherein the second upstream circuitry comprises a second forward error correction (FEC) recovery element configured to receive the second MAC-layer payload portion and to correct errors in the second MAC-layer payload portion.

9. The optical line terminal of claim 7, wherein the optical line terminal is configured to control a timing of the first and second burst transmissions such that the first optical transceiver receives the first MAC-layer payload portion simultaneously with the second optical transceivers receiving the second MAC-layer payload portion.

10. An optical line terminal, comprising:
a first optical transceiver configured to transmit a downstream optical signal across a first optical fiber coupled to the first optical transceiver, the first optical transceiver further configured to receive a first burst transmission from the first optical fiber;
a second optical transceiver configured to transmit the downstream optical signal across a second optical fiber coupled to the second optical transceiver, the second optical transceiver further configured to receive a second burst transmission from the second optical fiber;
a first burst-transmission recovery element coupled to the first optical transceiver and configured to receive the first burst transmission from the first optical transceiver, the first burst-transmission recovery element configured to synchronize to the first burst transmission based on a first media access control-layer (MAC-layer) overhead portion of the first burst transmission and to transmit first digital words defining a first MAC-layer payload portion of the first burst transmission;
first upstream circuitry configured to buffer a plurality of data packets of the first MAC-layer payload portion based on the first digital words;
a second burst-transmission recovery element coupled to the second optical transceiver and configured to receive the second burst transmission from the second optical transceiver, the second burst-transmission recovery element configured to synchronize to the second burst transmission based on a second MAC-layer overhead portion of the second burst transmission and to transmit second digital words defining a second MAC-layer payload portion of the second burst transmission; and
a control element configured to control a timing of the first and second burst transmissions across the first and second optical fibers, respectively, such that the first MAC-layer overhead portion overlaps with the second burst transmission.

11. The optical line terminal of claim 10, wherein the control element is configured to control the timing such that the first MAC-layer overhead portion overlaps with the second MAC-layer payload portion.

12. The optical line terminal of claim 10, wherein the first MAC-layer overhead portion includes a first preamble and a first delimiter, and wherein the second MAC-layer overhead portion includes a second preamble and second delimiter.

13. The optical line terminal of claim 12, wherein the first burst-transmission recovery element is configured to synchronize to the first burst transmission based on the first MAC-layer overhead portion, and wherein the second burst-transmission recovery element is configured to synchronize to the second burst transmission based on the second MAC-layer overhead.

14. The optical line terminal of claim 13, wherein the first burst-transmission recovery element is configured to identify the first MAC-layer payload portion within the first burst transmission based on the first MAC-layer overhead portion, and wherein the second burst-transmission recovery element is configured to identify the second MAC-layer payload portion within the second burst transmission based on the second MAC-layer overhead portion.

15. A method for use at an optical line terminal, comprising:
transmitting a downstream optical signal across a first optical fiber via a first optical transceiver of the optical line terminal;
transmitting the downstream optical signal across a second optical fiber via a second optical transceiver of the optical line terminal;
receiving a first burst transmission from the first optical fiber via the first optical transceiver;
receiving a second burst transmission from the second optical fiber via the second optical transceiver;
recovering a first media access control-layer (MAC-layer) payload portion of the first burst transmission via a first burst-transmission recovery element based on a first MAC-layer overhead portion of the first burst transmission;

buffering a plurality of data packets of the first MAC-layer payload portion subsequent to the recovering the first MAC-layer payload portion;

recovering a second MAC-layer payload portion of the second burst transmission via a second burst-transmission recovery element based on a second MAC-layer overhead portion of the second burst transmission;

buffering a plurality of data packets of the second MAC-layer payload portion subsequent to the recovering the second MAC-layer payload portion; and controlling a timing of the first and second burst transmissions across the first and second optical fibers, respectively, such that the first MAC-layer overhead portion overlaps with the second burst transmission.

16. The method of claim 15, wherein the controlling is performed such that the first MAC-layer overhead portion overlaps with the first MAC-layer payload portion.

17. The method of claim 15, further comprising:

stripping the first MAC-layer overhead portion from the first MAC-layer payload portion via the first burst-transmission recovery element; and stripping the second MAC-layer overhead portion from the second MAC-layer payload portion via the second burst-transmission recovery element.

18. The method of claim 15, wherein the first MAC-layer overhead portion includes a first preamble and a first delimiter, and wherein the second MAC-layer overhead portion includes a second preamble and second delimiter.

19. The method of claim 18, further comprising:

synchronizing the first burst-transmission recovery element to the first burst transmission based on the first preamble; and synchronizing the second burst-transmission recovery element to the second burst transmission based on the second preamble.

20. The method of claim 19, further comprising:

identifying the first MAC-layer payload portion within the first burst transmission based on the first delimiter; and identifying the second MAC-layer payload portion within the second burst transmission based on the second delimiter.

21. The optical line terminal of claim 1, further comprising downstream circuitry to form a downstream electrical signal by combining payload data with overhead information in accordance with an optical protocol for communication through a passive optical network, wherein the downstream circuitry is configured to transmit the downstream electrical signal to the first optical transceiver and the second optical transceiver, wherein the first and second optical transceivers are configured to convert the downstream electrical signal into the downstream optical signal for communication through the PON.

22. The optical line terminal of claim 21, the overhead information indicates a timing for upstream transmissions, including the first burst transmission and the second burst transmission, through the PON to the OLT.

23. The optical line terminal of claim 22, wherein the optical line terminal is configured to control a timing of the first and second burst transmissions across the first and second optical fibers, respectively, such that the first MAC-layer payload portion is non-overlapping with respect to the second MAC-layer payload portion and such that the first preamble overlaps with at least a portion of the second burst transmission.

24. The optical line terminal of claim 2, further comprising a combiner element coupled to the first and second burst-transmission recovery elements, the combiner element further coupled to the first upstream circuitry by a connection, wherein the combiner element is configured to transmit the first digital words and the second digital words via the connection to the first upstream circuitry.

25. The optical line terminal of claim 1, wherein the first burst-transmission recovery element provides at least a portion of the first preamble and the first delimiter to a control element and the second burst-transmission recovery element provides at least a portion of the second preamble and the second delimiter to the control element.

26. The optical line terminal of claim 4, wherein the combiner element is configured to receive the first digital words from the first burst-transmission recovery element and provide the first digital words to the first upstream circuitry and the combiner element is configured to receive the second digital words from the second burst-transmission recovery element and provide the second digital words to the first upstream circuitry.

27. The optical line terminal of claim 10, further comprising a combiner element coupled to the first and second burst-transmission recovery elements, the combiner element configured to provide the first upstream circuitry either the first digital words from the first burst-transmission recovery element or the second digital words from the second burst-transmission recovery element.

* * * * *